(12) United States Patent
Klarqvist et al.

(10) Patent No.: US 9,953,669 B1
(45) Date of Patent: Apr. 24, 2018

(54) TOOTHED SLIDER HIGH DENSITY HEAD GIMBAL ASSEMBLY SLIDER INTERCONNECT

(71) Applicant: Seagate Technology LLC, Cupertino, CA (US)

(72) Inventors: Jon Karsten Klarqvist, Roseville, MN (US); Ravishankar Ajjanagadde Shivarama, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/296,510

(22) Filed: Oct. 18, 2016

(51) Int. Cl.
*G11B 5/48* (2006.01)

(52) U.S. Cl.
CPC ................... *G11B 5/4853* (2013.01)

(58) Field of Classification Search
CPC .................................................. G11B 5/4853
USPC ........................................... 360/234.5, 236.5
See application file for complete search history.

(56) References Cited

U.S. PATENT DOCUMENTS

| | | | |
|---|---|---|---|
| 5,267,109 A | 11/1993 | Chapin et al. | |
| 6,421,205 B1 | 7/2002 | Dorius et al. | |
| 6,483,667 B1 | 11/2002 | Berg et al. | |
| 7,205,661 B2 * | 4/2007 | Wark ................ | G01R 1/06738 257/737 |
| 7,619,856 B2 * | 11/2009 | Matsumoto .......... | G11B 5/4826 29/603.06 |
| 7,881,017 B2 * | 2/2011 | Bhatia ................. | G11B 5/4853 360/234.5 |
| 8,023,229 B2 * | 9/2011 | Liu ......................... | G11B 5/40 360/234.5 |
| 8,259,415 B2 * | 9/2012 | Hutchinson ......... | G11B 5/4853 360/234.5 |
| 8,295,011 B2 | 10/2012 | Chou et al. | |
| 8,947,830 B1 * | 2/2015 | Collins ................ | G11B 5/4853 360/234.5 |
| 9,728,211 B1 * | 8/2017 | Murata ................ | G11B 5/4826 |
| 9,786,308 B1 * | 10/2017 | McNeill ............... | G11B 5/4853 |
| 2003/0151858 A1 * | 8/2003 | Hsiao ..................... | B82Y 10/00 360/323 |
| 2005/0036238 A1 * | 2/2005 | Tabakovic ............ | G11B 5/127 360/234.5 |
| 2005/0219753 A1 * | 10/2005 | Yamakura ............ | G11B 5/4826 360/234.5 |
| 2006/0072245 A1 * | 4/2006 | Motonishi ............. | G11B 5/455 360/234.5 |
| 2006/0221501 A1 * | 10/2006 | Sato ..................... | G11B 5/4853 360/234.5 |
| 2010/0321829 A1 * | 12/2010 | Hutchinson ......... | G11B 5/4853 360/234.5 |
| 2014/0153373 A1 * | 6/2014 | Fujimura ............. | G11B 5/4826 369/13.32 |
| 2014/0198411 A1 * | 7/2014 | Peng .................... | G11B 5/4826 360/234.5 |
| 2016/0234936 A1 * | 8/2016 | Okuno ..................... | G11B 5/60 |

* cited by examiner

*Primary Examiner* — Jefferson Evans
(74) *Attorney, Agent, or Firm* — Kagan Binder, PLLC

(57) ABSTRACT

A slider for use in a disk drive, the slider including a slider body having a leading surface and an opposite trailing surface, wherein the trailing surface includes portions with extensions or depressions. The extensions or depressions include a slider bond pad.

7 Claims, 3 Drawing Sheets

TOOTHED SLIDER HIGH DENSITY HEAD GIMBAL ASSEMBLY SLIDER INTERCONNECT

BACKGROUND

Sliders are fabricated for utilization within data storage disk drives for positioning a magnetic head comprising read and write elements relative to one or more spinning disks. Each slider typically comprises read and write elements along with electrical contacts to facilitate electrical connection with an electronic data control system. Sliders are provided with air bearing features that controllably affect the manner by which the slider flies on an air bearing created by a spinning disk. Specifically, the aerodynamic properties of the slider topography influence the fly height, pitch, roll, and other important features. These features range in size from nanometer size to millimeter size. The distance between the slider, which contains the read and write elements and the air bearing features, and a spinning disk, is typically 10 nm or less. Smaller sliders are being designed to fly closer with more and more electronic functionality required.

The fabrication process of a slider comprises multiple steps involving a high level of complexity, tight tolerances, and small size specifications. Typical processes steps include fine line photolithography, reactive ion etching, ion milling, and thin film deposition. A typical slider includes a substrate portion, an insulator layer and a multilayer thin film portion that comprises the operative layers and elements of the slider, such as including read and write transducers, heater elements, laser elements, and other transducer elements. The sliders' transducer elements are fabricated on wafers utilizing known wafer build techniques, which are described briefly below.

Sliders are fabricated from wafers that are created based upon the materials and layers specified for a desired slider construction. From such a wafer, a chunk or portion of the wafer is separated from the rest, and then the wafer portion is sliced into rowbars. In the form of slider rowbars, the common air bearing surface is to be lapped for sizing the slider while increasing surface flatness and decreasing surface roughness, and fine-tuning transducer critical dimensions. The air bearing surface of each slider is lapped to comply with desired surface standards. After lapping, an advanced air bearing surface is patterned on the lapped surface, the surface is coated protective film, and then the rowbars are diced into individual sliders.

The manufacturing of components of disk drive systems includes providing an electrical connection via solder material between sliders and suspension assemblies, either or both of which may include bonding pads. This solder material used for connection of components is often supplied via solder jetting, wherein typical trailing slider surface interconnects are provided in a single plane and arranged in a single row. Such a configuration, in combination with at least some inherent trajectory error and possible solder ball expansion upon impact with a surface to which it is applied, can lead to inadequate separation between the solder interconnect and adjacent interconnects, bonding pads, or traces. This can then lead to bridged or open connections in high connection density applications. These challenges will increase as the number of slider pads provided on a slider is increased to greater than the standard nine and eleven slider pads used in the industry. There is a desire to provide slider configurations that allow for solder connections in high density applications without bridging between adjacent connections.

SUMMARY

Aspects of the invention described herein are directed to the placement of solder materials to provide for consistent connection of sliders to their associated head gimbal assemblies in hard disc drives. Such methods and configurations are particularly beneficial with the continuing desire to decrease the size of electronic components in the data storage industry.

In accordance with the invention, trailing surface interconnects are separated into multiple rows, thereby increasing the separation between adjacent interconnects. The risk of open and bridged connection can be further reduced if the invention is used in combination with current techniques of reducing solder volume and improving tooling accuracy to increase the interconnect density. Embodiments of the invention utilize increased pad pitch through the use of a toothed slider to increase the interconnect density without reducing the volume of the molten metal used for interconnection. That is, the slider configuration of the invention allows for increased interconnect density interconnect while maintaining a desired solder ball size to achieve a reliable connection between components. The slider configuration will also allow a larger misalignment tolerance without solder bridging problems than is possible using the traditional approach of positioning interconnects in a single row on a planar surface. In fact, it may be possible to use larger solder volume than is possible when interconnects are placed in a single row. Such larger solder volumes can beneficially provide for better joint strength and reliability.

Embodiments of the invention provide for increased density for trailing slider surface interconnects by shaping the slider trailing slider surface into "teeth," which allow separation of the interconnects into two (or more) alternating rows. This separation thereby provides an increase of the effective distance between neighboring interconnects. In addition, the shaped surfaces will effectively create a wall or barrier between interconnects, which can further reduce the risk of solder bridging between adjacent interconnects. Such a configuration can also be used in combination with other changes proposed for increased interconnect density.

In accordance with the invention, a slider is provided for use in a disk drive. The slider includes a slider body that has a leading surface and an opposite trailing surface. The slider further includes at least one protrusion or "tooth" extending from the trailing surface, with at least one protrusion slider bond pad being positioned on a distal end of at least one of the protrusions. The slider further includes at least one recessed slider bond pad that is positioned on the trailing surface of the slider body. That is, this recessed slider bond pad is essentially on the trailing surface, and is "recessed" relative to an adjacent protrusion or "tooth." In an embodiment, protrusion slider bond pads and recessed slider bond pads are provided across the width of the trailing edge, wherein each protrusion slider bond pad is adjacent to at least one recessed slider bond pad. In an embodiment, the slider includes at least two protrusions that are spaced from each other by a gap, wherein each gap includes one recessed slider bond pad.

In another embodiment of the invention, the pads would not be provided on the protruding teeth, but pads are instead recessed into depressions in the trailing slider surface. The benefits in terms of interconnect density will be similar, but in some cases will better integrate with the wafer, slider, and head gimbal assembly manufacturing processes.

Further in accordance with the invention, a head gimbal assembly is provided for a disk drive, the assembly including a suspension comprising a suspension mounting surface on which at least one suspension bond pad is positioned, and a slider positioned adjacent the suspension mounting surface. The slider includes a slider body with a leading surface and an opposite trailing surface, at least one protrusion extending from the trailing surface, each protrusion having a distal end, at least one protrusion slider bond pad positioned on the distal end of the at least one protrusion, wherein each protrusion slider bond pads is aligned with one of the suspension bond pads to provide at least one protrusion bond pad pair, and at least one recessed slider bond pad positioned on the trailing surface of the slider body, wherein each recessed slider bond pad is aligned with one of the suspension bond pads to provide a recessed bond pad pair. The assembly further includes a protrusion solder joint connecting the protrusion slider bond pad and the suspension bond pad of at least one of the protrusion bond pad pairs, and a recessed solder joint connecting the recessed slider bond pad and the suspension bond pad of at least one of the recessed bond pad pairs.

These and various other features and advantages will be apparent from a reading of the following detailed description.

BRIEF DESCRIPTION OF THE DRAWINGS

The present invention will be further explained with reference to the appended Figures, wherein like structure is referred to by like numerals throughout the several views, and wherein.

DETAILED DESCRIPTION

Figure 1:
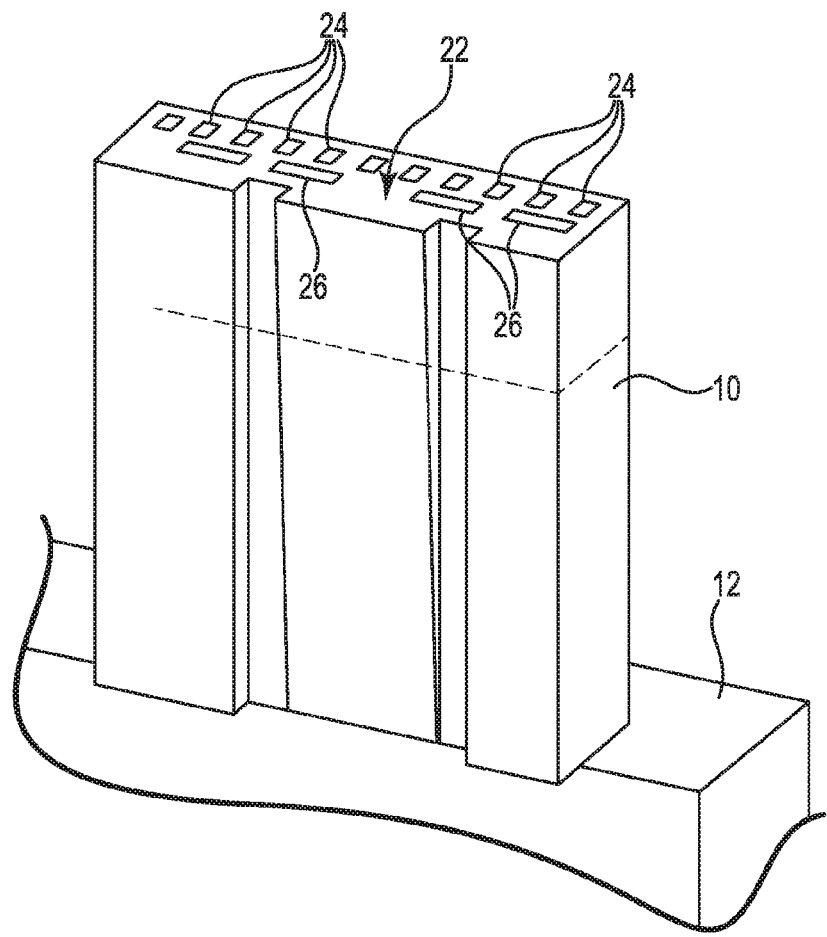
FIG. 1 is a schematic illustration in perspective of a head slider positioned relative to a supporting head suspension assembly and showing electrical bond pads arranged in rows over a surface area of the slider.

Referring now to the Figures, wherein the components are labeled with like numerals throughout the several Figures, and initially to FIG. 1, an exemplary configuration of a typical head slider 10 is illustrated, which is operatively supported from a head suspension assembly 12. The operative connection between a slider 10 and a head suspension assembly typically includes the provision of a gimbal or flexure element (not shown) for permitting the slider to move at least along pitch and roll axes relative to the presentaion of the slider to a spinning disk The gimbal or flexure can be created integrally with the head suspension assembly 12 or as a separate component and attached to the head suspension assembly. In either case, the gimbal or flexure includes a slider bond pad (not shown) to which the slider 10 is attached for controlled movement of the slider 10 as such flies over the media surface of a spinning disk.

Figure 2:
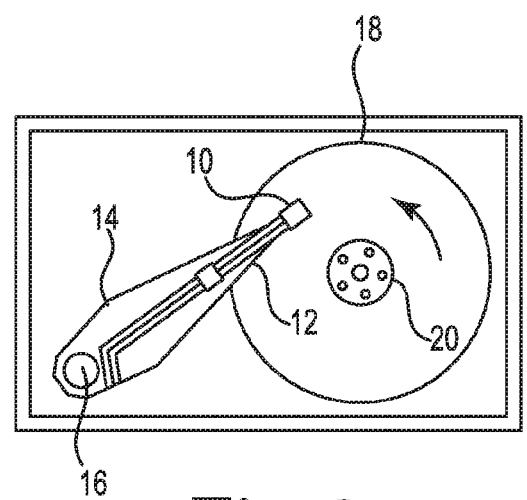
FIG. 2 is a plan view of a hard disk drive including a rotatable magnetic hard disk media and a head suspension assembly supporting a slider as such is movable over selective data tracks of the media.

FIG. 2 schematically illustrates a slider 10 as operatively supported by a head suspension 12, which in turn is connected to an actuator arm 14 that is movable about a hub 16. The actuator arm 14 is movable under the control of a voice coil motor or the like so that the slider 10, and in particular its read and write transducer elements (not shown) can be positioned at desired data tracks of spinning magnetic media, such as the hard disk 18 as such is rotatable about hub 20, as is well known in the industry.

Referring again to FIG. 1, a trailing edge 22 of the slider 10 includes a series of first electrical contacts or bond pads 24 that are illustrated in a row over a portion of the trailing edge 22. Another row of a second series of electrical contacts or bond pads 26 is also provided adjacent to the bond pads 24. This embodiment provides for one exemplary arrangement of bond pads, wherein it is understood that any number of arrangements of bond pads 24 and 26 relative to each other can instead be provided.

According to the illustrated embodiment, the bond pads 24, 26 are provided for electrically connecting to the transducer devices and other devices built into a slider design, such as including contacts for read and write transducers, read and write heaters, bolometers, or laser elements as may be provided for operation of a head slider design. Certain functional elements of such a slider require two bond pads for electrical operation, while others require a single bond pad for electrical operation. These bond pads are conventionally electrically connected with wires or conductor elements that are typically provided to extend along the supporting head suspension assembly for controlled operation of each of the functional elements of the head slider.

The second set of bond pads 26 are provided for utilization during the fabrication process of the head slider 10 from a wafer or fabricated substrate, as opposed to the operative use of bonding pads 24 for slider 10 elements during operation of a disk drive. These bond pads 26 are provided to allow for temporary electrical connection of electrical lapping guides (ELGs) during slider fabrication processes. As such, a pair of the bond pads 26 is used for monitoring the material removal during slider processing.

Figure 3:
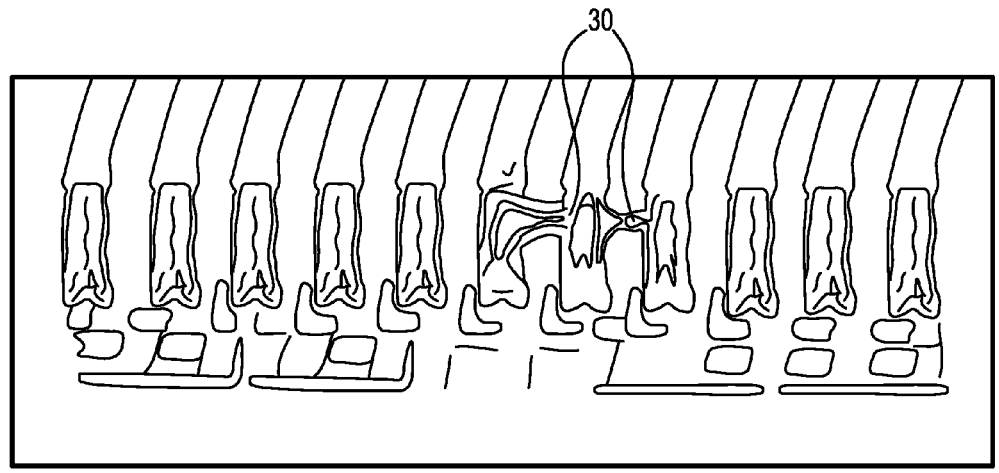
FIG. 3 is a plan view of a trailing edge of a slider including eleven slider pads and illustrating two occurrences of bridging between adjacent interconnects during the soldering process.

FIG. 3 is a plan view of a trailing edge of a slider including eleven slider pads positioned along a single planar surface of a slider (e.g., a 700 um wide slider). As shown, this slider includes two occurrences of bridging between adjacent interconnects during the soldering process, each of which is represented by the reference number 30. Such bridging can occur for a number of reasons, including difficulty in controlling the precise volume and positioning of solder application for these high density interconnect configurations. The embodiments of the invention described herein provide a solution to minimize or eliminate occurrences of solder bridging on a slider.

Figure 4:
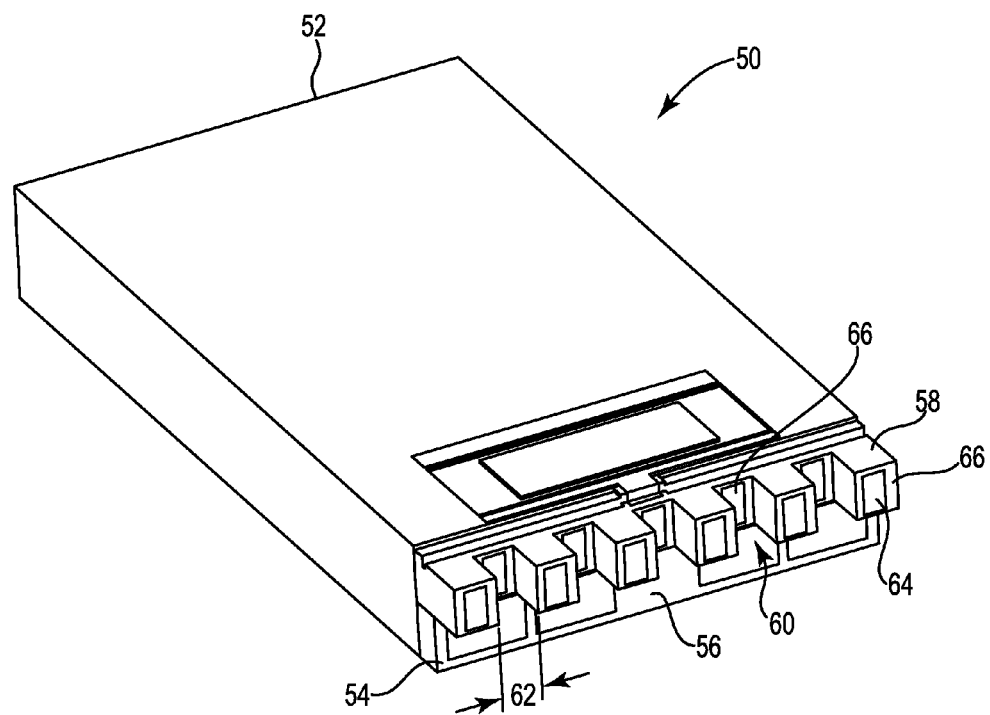
FIG. 4 is a perspective view of a slider having a trailing edge that includes a staggered or "toothed" surface with bond pads positioned at varying distances from the trailing edge surface, in accordance with the invention.

Referring now to FIG. 4, a slider 50 is illustrated, which includes a leading edge 52 and an opposite trailing edge 54. Trailing edge 54 includes a trailing edge base surface 56 and at least one protrusion or tooth 58 extending from the trailing edge base surface 56. Although the number of protrusions can vary, in the illustrated embodiment, the trailing edge 54 includes six protrusions 58 that are spaced from each other across the width of the slider by a gap 60 having a gap distance 62. The gap distance 62 between each adjacent pair of protrusions 58 can be the same or different across the width of the slider 50, although the illustrated embodiment shows the gap distances 62 to be the same for each of the gaps 60.

At least one of the protrusions 58 includes a protrusion slider bond pad 64 at its distal end 66, and in the illustrated embodiment, each of the protrusions 58 includes a protrusion slider bond pad 64 at its distal end 66. In addition, at least one of the portions of the base surface 56 between the protrusions 58 (i.e., the areas of the base surface 56 in the gaps 60) includes a recessed slider bond pad 68, and in the illustrated embodiment, each of the gaps 60 includes a recessed slider bond pad 66 on the base surface 56.

Although the illustrated embodiment includes six protrusions 58 and five gaps 60 across the width of the trailing edge 54, it is understood that a different number of protrusions 58 can be provided, wherein either an even or an odd number of protrusions 58 can be used. In a configuration in which an even number of protrusions 58 is provided, they can be arranged as shown in FIG. 4, with a protrusion 58 adjacent to each of the opposite ends of the trailing edge 54, and alternating gaps 60 and protrusions 58 between them. In a configuration in which an odd number of protrusions 58 is provided, they can be arranged such that a protrusion 58 is adjacent to one of the ends of the trailing edge 54 and a gap 60 (i.e., a surface that is at the level of the base surface 56) is adjacent to the other of the ends of the trailing edge 54.

In any of the configurations of protrusions 58 and gaps 60, the gap distances 62 and the width of the distal end 66 of each of the protrusions 58 can be the same or different from each other across the trailing edge 54. In the illustrated embodiment of FIG. 4, the gap distances 62 and the width of the distal end 66 of each of the protrusions is approximately equal. In another embodiment, the gap distances 62 are at least slightly wider than the distal ends 66 of the protrusions 58, and it is contemplated that at least one of the gaps 60 can be at least twice as wide as the distal ends 66 of the protrusions 58 so that more than one recessed slider bond pad 68 can be positioned within the relatively wide gap 60. Similarly, it is contemplated that the distal end 66 of at least one of the protrusions 58 is at least twice as wide as the gaps 60 so that more than one protrusion slider bond pad 64 can be positioned at its distal end 66.

The protrusion slider bond pads 64 and the recessed slider bond pads 68 can be the same or a different size across the trailing edge 54, which can be selected and positioned depending on the size, shape, and locations of the protrusions. The bond pads 64, 66 can also have different shapes from each other and/or be made of the same or different materials.

Figure 5:
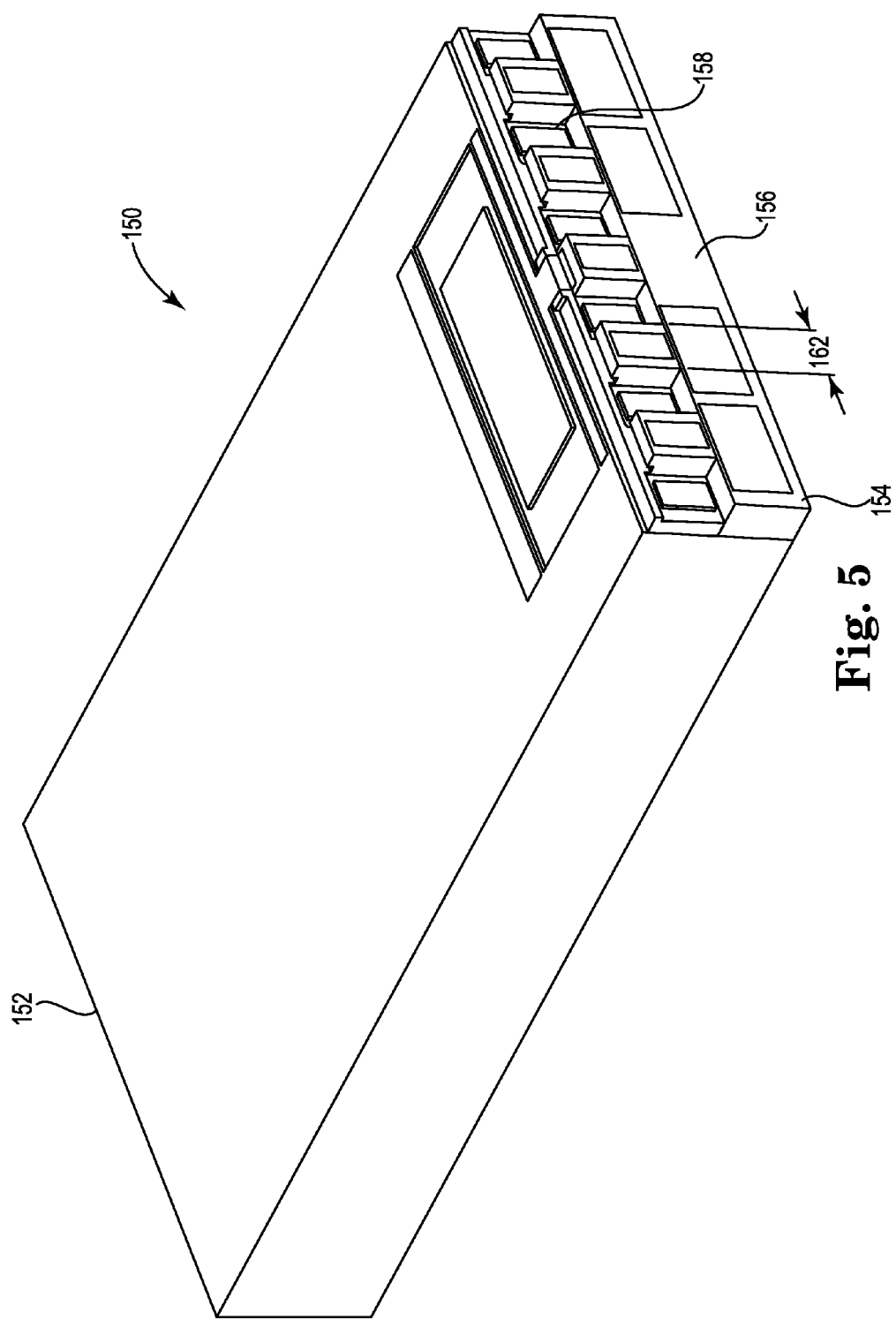
FIG. 5 is a perspective view of another embodiment of a slider having a trailing edge that includes a staggered or "toothed" surface with bond pads positioned at varying distances from the trailing edge surface, in accordance with the invention.

FIG. 5 illustrates an embodiment of a slider 150, which includes a leading edge 152 and an opposite trailing edge 154. Trailing edge 154 includes a trailing edge base surface 156 and at least one depression 158 extending "into" the base surface 156. In the illustrated embodiment, the trailing edge 154 includes six depressions 158 that are spaced from each other across the width of the slider by a distance 162. The distance 162 between each adjacent pair of depressions 158 can be the same or different across the width of the slider 150, although the illustrated embodiment shows the distances 162 to be the same across the width of the slider 150. In the illustrated embodiment, there are depressions 158 at both edges of the trailing edge 154 such that there are not corresponding planar or non-depressed areas on both sides of those depressions 158. Alternatively, the depressions 158 can all be between planar or non-depressed areas such that the depressions 158 are bounded on both sides by planar or non-depressed areas.

The sliders of the invention can be manufactured using a variety of techniques, wherein examples of such techniques are described herein. With any of the manufacturing processes, read/write heads described above are carried by a slider that is used to read from and write to a data track on a disc. The slider is carried by an arm assembly that includes an actuator arm and a suspension assembly, which can include a separate gimbal structure or can integrally form a gimbal. In a typical process, an array of sliders are formed on a common substrate or an AlTiC wafer which is then sliced to produce bars, with a row of sliders in a side-by-side pattern on each bar. The bars (which are referred to herein as row bars) are then subjected to a series of processes to form individual sliders, including lapping, cleaning, formation of air-bearing surfaces (ABS), and dicing.

In an exemplary manufacturing method, wafer level sliders are photo patterned, and a sacrificial material (e.g., copper) is deposited to the distal ends of the protrusions. The slider can then be backfilled with dielectric material, such as alumina, silica, or the like. The wafer can also be planarized, and bond pads for the teeth or protrusions can be patterned and deposited. The bond pads may be made of, for example, a combination of nickel and gold. The sacrificial material can then be removed with particularly designed etch or strip methods and processes. The toothed wafer may then be processed into toothed rowbars, and toothed sliders using slice and grind techniques common in the industry.

In another exemplary manufacturing process, a wafer can be processed with thick gold studs on each pad, along with a thick overcoat. A laser milling process can then be used to pattern teeth on the wafer/bars or slider. The wafer may then be processed into toothed rowbars, and sliders using slice and grind techniques common in the industry. The laser milling may be done, at the wafer level, rowbar level, or on individual (atomic) sliders. The laser milling could be done before or after a slider test, whichever is more convenient. Alternatively, the material between the teeth can be removed using by machining processes, such as cutting tools, mills, grinding wheels, and the like.

An exemplary manufacturing method for use with embodiments of the invention includes patterning a first set of bond pads in a lower level early in the transducer build. The bond pads may be made of, for example, a combination of nickel and gold. The bond pads may be covered with sacrificial material, such as copper, during the remainder of the transducer patterning, material deposition, planarization, and etching process steps. After the final trailing bond pads are patterned and deposited, the sacrificial material is removed using particularly designed etch or strip methods appropriate for the sacrificial materials used. The wafer with the depressed bond pads may then be processed into toothed rowbars, and then these toothed rowbars can be made into toothed sliders using slice and grind techniques common in the industry.

The head gimbal assemblies of the invention can be manufactured using a variety of techniques, wherein a number of the assembly process steps will be common with the assembly processes used for standard, non-toothed, sliders, up to the point of thermal interconnect. For the thermal interconnect, one exemplary process includes first dispensing solder to provide a first row of interconnects, such as at the slider bond pads on the protrusions. In an embodiment, this interconnection process can start with the outer interconnects, as it can often minimize the deformation of the assembly due to stress build up in the cooling interconnects. However, it is contemplated that the interconnection process can be performed in a variety of different sequences. In any case, after the first row of interconnects is placed, the process can be repeated with a second row of interconnects, such as at the slider bond pads in the recessed areas between protrusions. As with the first row of sliders, the interconnection process for the second row of bond pads can start with the outer interconnects, the inner interconnects, or in a different sequence.

The present invention has now been described with reference to several embodiments thereof. The foregoing detailed description and examples have been given for clarity of understanding only. No unnecessary limitations are to be understood therefrom. It will be apparent to those skilled in the art that many changes can be made in the embodiments described without departing from the scope of the invention. The implementations described above and other implementations are within the scope of the following claims.

What is claimed is:

1. A slider for use in a disk drive in combination with a suspension, the slider comprising:
   a slider body comprising a leading surface and an opposite trailing surface;
   at least one protrusion extending from the trailing surface, each protrusion having a distal end;
   at least one protrusion slider bond pad positioned on the distal end of the at least one protrusion; and
   at least one recessed slider bond pad positioned on the trailing surface of the slider body; and
   the suspension comprising:
   a suspension mounting surface on which at least one suspension bond pad is positioned, wherein each protrusion slider bond pad is aligned with one of the suspension bond pads to provide at least one protrusion bond pad pair,
   wherein each recessed slider bond pad is aligned with one of the suspension bond pads to provide a recessed bond pad pair, the combination further comprising:
      a protrusion solder joint connecting the protrusion slider bond pad and the suspension bond pad of at least one of the protrusion bond pad pairs; and
      a recessed solder joint connecting the recessed slider bond pad and the suspension bond pad of at least one of the recessed bond pad pairs.

2. A slider for use in a disk drive in combination with a suspension,
   the slider comprising:
   a slider body comprising a leading surface and an opposite trailing surface;
   at least one depression extending below the trailing surface, each depression having a face surface;
   at least one depression slider bond pad positioned on the face surface of the at least one depression; and
   at least one trailing surface slider bond pad positioned on the trailing surface of the slider body;
   wherein each of the at least one depression slider bond pads is distinct from and spaced from each of the at least one trailing surface slider bond pads; and
   the suspension comprising:
   a suspension mounting surface on which at least one suspension bond pad is positioned, wherein each depression slider bond pad is aligned with one of the suspension bond pads to provide at least one depression bond pad pair, and wherein each trailing surface slider bond pad is aligned with one of the suspension bond pads to provide a trailing surface slider bond pad pair, the combination further comprising:
   a depression solder joint connecting the depression slider bond pad and the suspension bond pad of at least one of the depression bond pad pairs; and
   a trailing surface solder joint connecting the trailing surface slider bond pad and the suspension bond pad of at least one of the trailing surface bond pad pairs.

3. The slider of claim 2, wherein the at least one depression comprises at least two depressions spaced from each other across a width of the trailing surface.

4. The slider of claim 3, wherein one of the trailing surface slider bond pads is positioned on the trailing surface between two adjacent depressions.

5. A method of forming an electrical interconnection between a slider and a suspension that is adjacent to and positioned at an angle relative to the slider, the method comprising the steps of:
   positioning a slider at an angle relative to an adjacent suspension, wherein the suspension comprises a suspension mounting surface on which at least one suspension bond pad is positioned, and wherein the slider comprises:
      a slider body comprising a leading surface and an opposite trailing surface;
      at least one protrusion extending from the trailing surface, each protrusion having a distal end;
      at least one protrusion slider bond pad positioned on the distal end of the at least one protrusion, wherein each protrusion slider bond pad is aligned with one of the suspension bond pads to provide at least one protrusion bond pad pair; and
      at least one recessed slider bond pad positioned on the trailing surface of the slider body, wherein each recessed slider bond pad is aligned with one of the suspension bond pads to provide a recessed bond pad pair;
   forming a protrusion solder joint between the protrusion slider bond pad and the suspension bond pad of at least one of the protrusion bond pad pairs; and
   forming a recessed solder joint between the recessed slider bond pad and the suspension bond pad of at least one of the recessed bond pad pairs.

6. The method of claim 5, wherein the protrusion solder joint and recessed solder joint are formed simultaneously.

7. The method of claim 5, wherein the protrusion solder joint and recessed solder joint are formed sequentially.

* * * * *